United States Patent [19]
Hornbeck

[11] Patent Number: 5,583,688
[45] Date of Patent: Dec. 10, 1996

[54] MULTI-LEVEL DIGITAL MICROMIRROR DEVICE

[75] Inventor: Larry J. Hornbeck, Van Alstyne, Tex.

[73] Assignee: Texas Instruments Incorporated, Dallas, Tex.

[21] Appl. No.: 171,303

[22] Filed: Dec. 21, 1993

[51] Int. Cl.⁶ ..................................................... G02B 26/00
[52] U.S. Cl. ........................... 359/291; 359/224; 359/846
[58] Field of Search ..................................... 359/290, 291, 359/292, 846, 214, 223, 224, 230

[56] References Cited

U.S. PATENT DOCUMENTS

| | | | |
|---|---|---|---|
| 5,083,857 | 1/1992 | Hornbeck | 359/291 |
| 5,202,785 | 4/1993 | Nelson | 359/214 |
| 5,212,582 | 5/1993 | Nelson | 359/214 |
| 5,233,456 | 8/1993 | Nelson | 359/214 |

FOREIGN PATENT DOCUMENTS

0469293A1  2/1992  European Pat. Off. .

*Primary Examiner*—Loha Ben
*Attorney, Agent, or Firm*—James C. Kesterson; Charles A. Brill; Richard L. Donaldson

[57] ABSTRACT

An improved hidden hinge digital micromirror device, and method of making the same, having hinges 424 attached to a yoke 428 which limits the rotation of the device mirror 430. In one embodiment, the mirror 430 is supported by a center support post 416 attached to two torsion hinges 424 by a landing hinge yoke 428. The ends of the torsion hinges 424 are attached to two support posts 426 which hold the hinges 424 above the substrate 400 and allow the hinges 424 to twist in a torsional fashion. The device is fabricated using two sacrificial spacer layers 404, 414 which are removed to allow the mirror 430 to rotate.

38 Claims, 13 Drawing Sheets

MULTI-LEVEL DIGITAL MICROMIRROR DEVICE

TECHNICAL FIELD OF THE INVENTION

This invention relates to digital micromirror devices and more particularly to such devices where the torsion hinges are constructed in a plane different from the reflective surface.

RELATED APPLICATIONS

All of the following patent applications have been assigned to Texas Instruments Incorporated and are hereby incorporated by reference.

| | |
|---|---|
| U.S. Pat. No. 4,566,935 | Spatial Light Modulator and Method Dated January 28, 1986; |
| U.S. Pat. No. 4,615,595 | Frame Addressed Spatial Light Modulator Dated October 7, 1986; |
| U.S. Pat. No. 4,662,746 | Spatial Light Modulator and Method Dated May 5, 1987; |
| U.S. Pat. No. 5,061,049 | Spatial Light Modulator and Method Dated October 29, 1991; |
| U.S. Pat. No. 5,083,857 | Multi-Level Deformable Mirror Device Dated January 28, 1992; and |
| U.S. Pat. No. 5,096,279 | Spatial Light Modulator and Method Dated March 17, 1992; |

BACKGROUND OF THE INVENTION

One type of spatial light modulator (SLM) is the digital micromirror device (DMD). Digital micromirror devices have also been called deformable micromirror devices although that term is now used exclusively for devices that operate in an analog mode. DMDs are finding many uses in light deflecting technologies. The devices are small mirrors which rotate or deflect in response to an electrical signal to redirect incident light. In some applications, an array of DMDs is used to modulate light and produce patterns or images when the individual DMD elements, called pixels, are selectively rotated.

DMDs are typically used in a dark field projection arrangement and may be used, for example, in HDTV applications where a large array of pixels is necessary for the desired clarity. The ideal DMD should produce a high resolution image with uniform brightness, high contrast, and be extremely reliable. DMD elements must be designed to operate many times without failure in order to be reliable enough for commercial display systems. This requires a rugged, producible design that minimizes the stress and wear on the DMD elements.

Primarily two types of DMDs are used in imaging applications, the conventional torsion beam DMD and the hidden hinge DMD. Both use electrostatic attraction to rotationally deflect a mirror and twist a pair of torsion hinges. The conventional torsion beam DMD mirror is supported directly by the torsion hinges which are also attached to hinge support posts. One drawback of the conventional torsion beam DMD is the hinges and hinge support posts scatter incident light which reduces the contrast ratio of the display. Also, because the torsion hinges and hinge support posts are located in the plane of the mirrors, the mirror area is reduced, resulting in decreased image brightness. The hidden hinge architecture addresses these problems by moving the hinge support posts and torsion hinges below the mirrors. The mirrors are supported above the plane of the hinges by a mirror support post.

SUMMARY OF THE INVENTION

The present invention provides a digital micromirror device (DMD), and a method of making the same, having a mirror element suspended above a substrate by an underlying hinge which allows the mirror to rotationally deflect. A landing hinge yoke is attached to the hinges to limit the travel of the mirror. The landing yoke is shorter than the mirror. Hence, less sticking torque is generated compared to a conventional hidden hinge DMD, where the mirror tip lands. Less sticking torque results in a lower reset voltage requirement.

The disclosed DMD design has several advantages over existing designs including improved brightness uniformity, facilitation of staggered pixels which results in higher horizontal resolution, elimination of pixel "twinkling", freedom from diagonal mechanical defects, stable reset voltage requirements throughout the life of the device, less dependence on proper mirror to hinge alignment, rectangular pixel capability, and the facilitation of horizontal split reset addressing.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
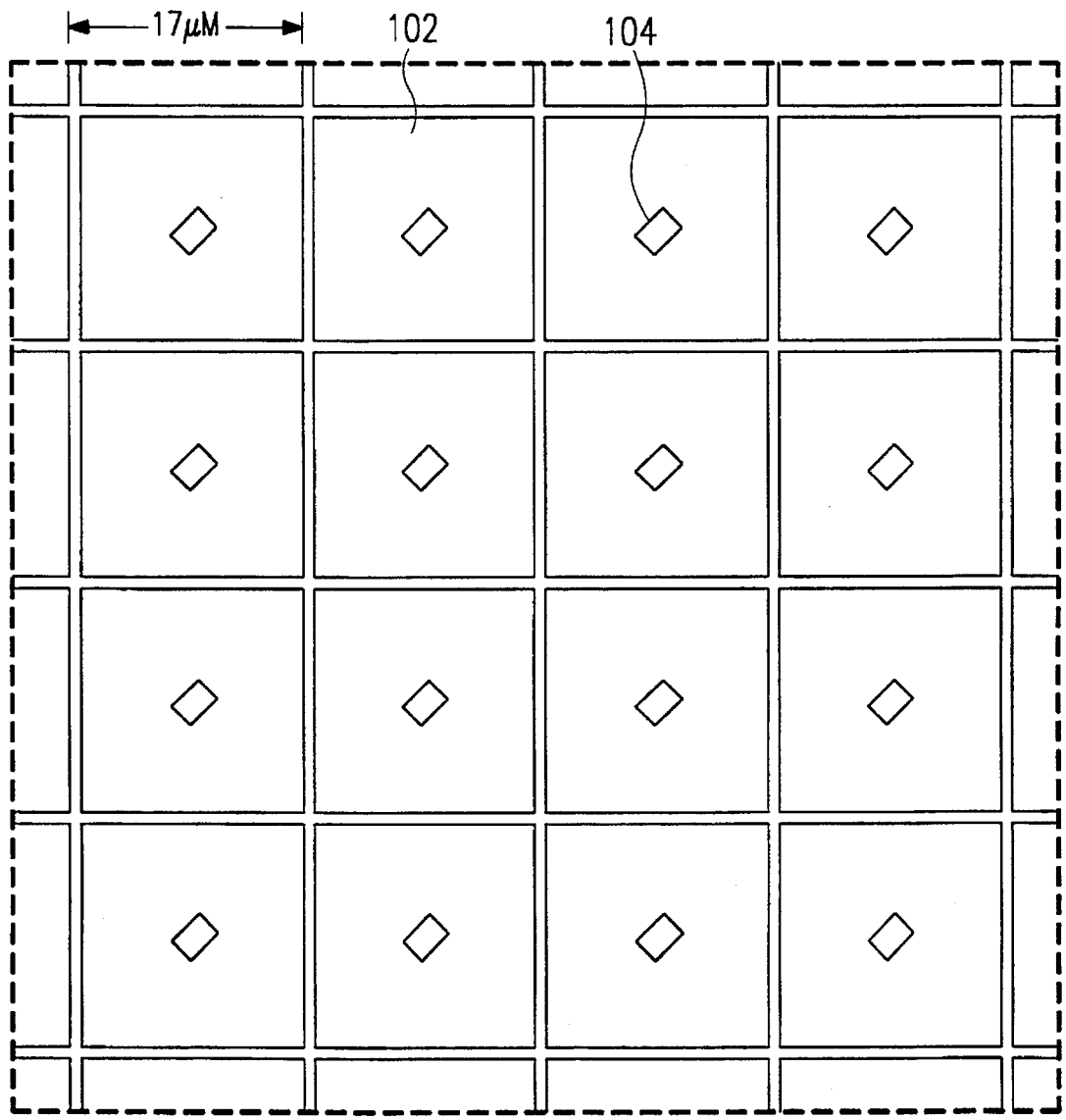
FIG. 1 is a plan view of a DMD array according to a first embodiment of the present invention.
Figure 2:
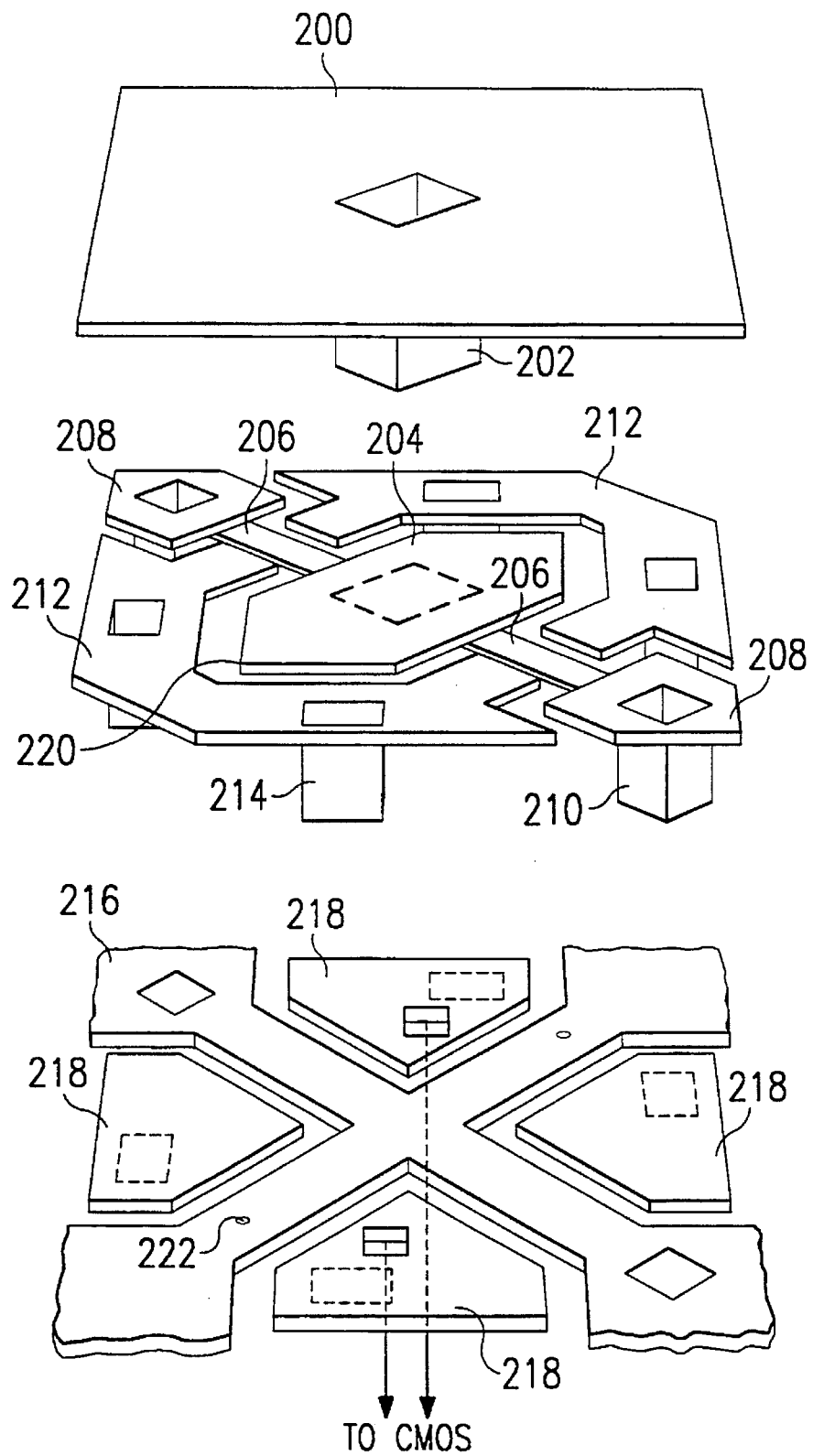
FIG. 2 is an exploded view of one element of the DMD array of FIG. 1.

FIG. 1 shows a plan view of a portion of a hidden hinge digital micromirror device array 100 according to a first embodiment of the present invention. Typically each element in the array is a square mirror 102 fabricated on 17 μm centers with a gap between mirrors of approximately 1 μm. Each mirror element is supported by a support post 104 which is typically in the center of the mirror. FIG. 2 is an exploded view of one element, or pixel, of the DMD array of FIG. 1. Mirror 200 is supported by mirror support post 202 which is on landing yoke 204. Landing yoke 204 is attached to one end of each of the torsion hinges 206. The other end of each torsion hinge 206 is attached to a hinge support post cap 208 on top of the hinge support post 210. Address electrodes 212 are supported by the address support posts 214. Address support posts 214 and hinge support posts 210 support the address electrodes 212, torsion hinges 206, and the landing yoke 204 away from the bias/reset bus 216 and address electrode pads 218. When the mirror is rotated, sometimes referred to as deflected, the tip 220 of the landing yoke 204 contacts the bias/reset bus 216 at the landing site 222.

Figure 3A:
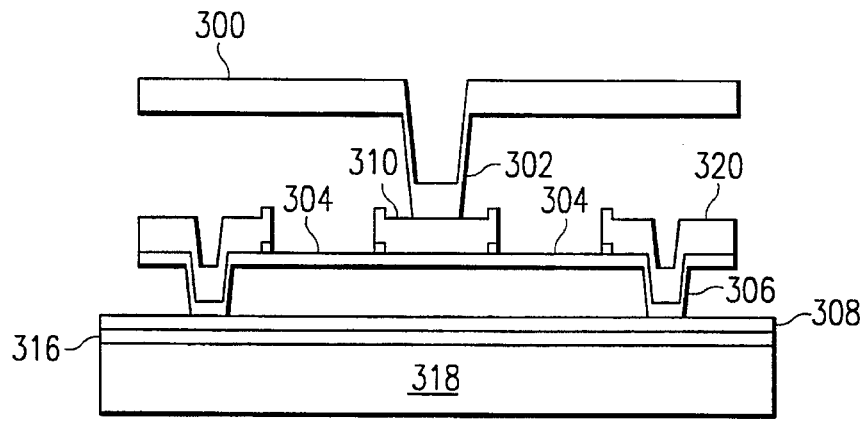
FIG. 3a is a cross-sectional view of one element of the DMD array of FIG. 1 taken along the hinge axis.

FIG. 3a shows one element of the array of FIG. 1 in section along the hinge axis. Mirror 300 is on mirror support post 302. Mirror support post 302 is attached to the hinge yoke 310. The hinge yoke 310 is attached to one end of each of the two torsion hinges 304. The other end of each torsion hinge 304 is attached to a hinge support post cap 320 which is held away from the substrate 318 by a hinge support post 306 built on top of metalization layer 308. Metalization layer 308 overlays an oxide overcoat 316 which protects the semiconductor substrate 318.

Figure 3B:
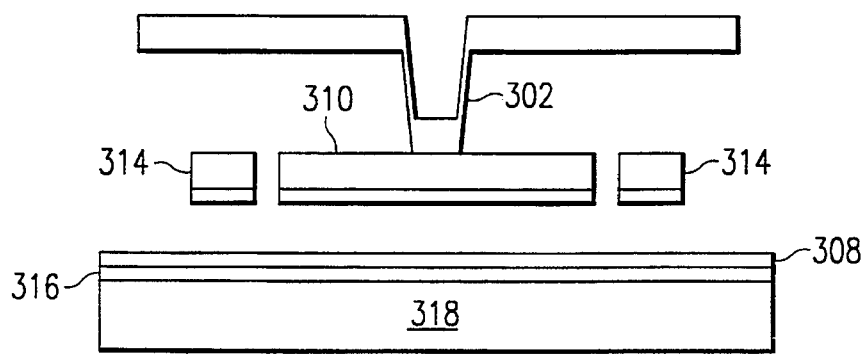
FIG. 3b is a cross-sectional view of one element of the DMD array of FIG. 1 taken perpendicular to the hinge axis.

FIG. 3b is a section view of one element of the array of FIG. 1 taken perpendicular to the hinge axis. The mirror support post 302 is on top of the hinge yoke or landing yoke 310. Hinge yoke 310 is designed to rotate in unison with the mirror element 300 and mirror support post 302 as the mirror 300 is rotated. Address electrodes 314 are supported by address electrode support posts fabricated on top of metalization layer 308. The address electrode support posts are not in the cross section plane and are not shown.

Figure 3C:
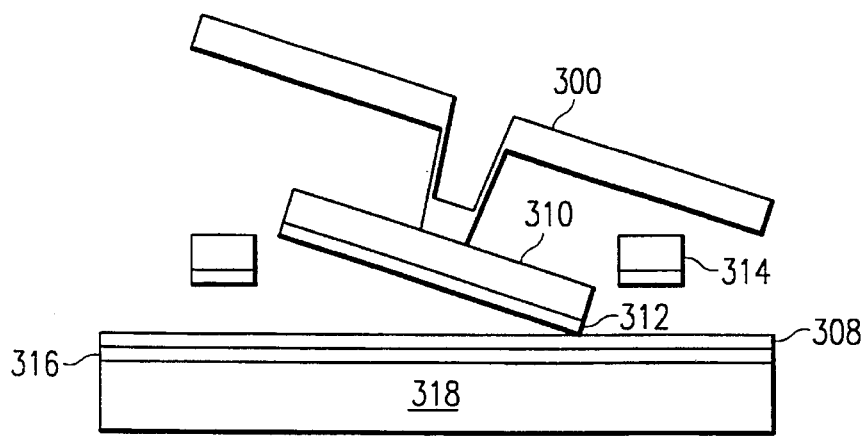
FIG. 3c is a cross-sectional view of one element of the DMD array of FIG. 1 taken perpendicular to the hinge axis and showing the mirror and landing yoke in a rotated position.

The metalization layer 308, typically the third metalization layer or M3, overlays an oxide overcoat 316 which is designed to protect the semiconductor substrate 318. The substrate 318 which is typically silicon, has address circuitry fabricated on its surface. The tip 312 of the hinge yoke 310 is constructed to land on M3 308, as shown in FIG. 3c, before the mirror 300 contacts the address electrode 314. Therefore, the extent to which the mirror element rotates is limited by the design of the landing tip 312. Prior art DMD designs typically landed on the tip of the mirror instead of a hinge yoke.

One fabrication sequence is shown in FIGS. 4a–4f. The process begins in FIG. 4a with a substrate 400 that has an address circuit fabricated on it and is covered with a protective oxide layer 402. Holes are opened in the oxide layer to allow metalization layer M3 408 to contact the underlying circuitry layer where necessary. Hinge spacer layer 404 is spin-deposited over the address circuit yielding a planar surface on which to build the hinges and electrodes. The hinge spacer layer 404 is patterned to form holes 406 defining the electrode support posts and the hinge support posts. The holes for the electrode support posts are not shown in the cross section views of FIGS. 4a–4f but are similar to the hinge support post holes The spacer thickness will determine the hinge air gap which, as will be discussed, determines the mirror rotation angle. The spacer layer is typically a 1.0 μm thick positive photoresist which is deep UV hardened to a temperature of 200° C. to prevent flow and bubbling during subsequent processing steps.

Figure 4A:
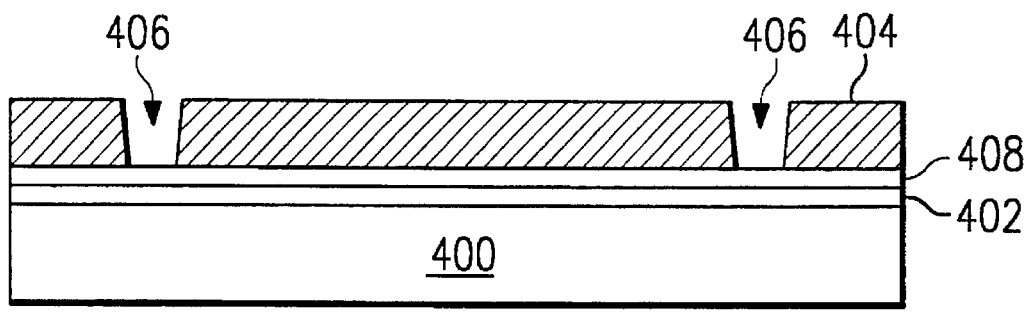
FIG. 4a is a cross-sectional view of one element of the DMD array of FIG. 1 taken along the hinge axis showing the hinge spacer layer.
Figure 4B:
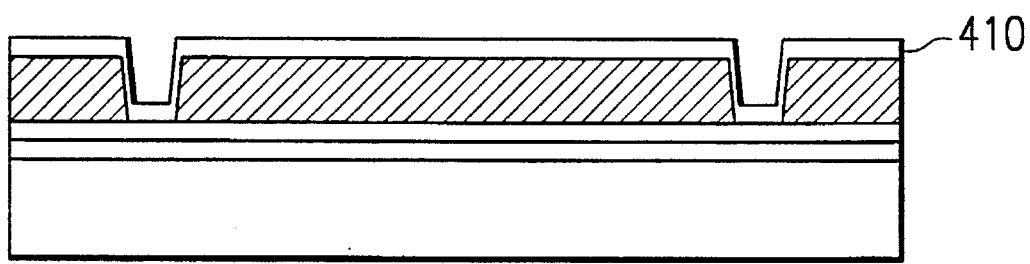
FIG. 4b is a cross-sectional view of one element of the DMD array of FIG. 1 taken along the hinge axis showing the hinge metal layer.

The hinges and electrodes are deposited and formed in a multi-step process beginning in FIG. 4b. First, a thin layer 410 of an aluminum alloy is deposited to form the hinges 424 of the device. This layer is typically a 600 Angstrom thick layer of an alloy of 0.2% Ti, 1% Si and the remainder Al. Second, an oxide is plasma-deposited and patterned in the shape of the hinges. A thicker metal layer 412, typically 3000 Angstroms thick, of aluminum alloy is then deposited forming the electrodes, support posts 426, and hinge yoke 428. A second masking oxide is then plasma-deposited and patterned in the shape of the electrodes, electrode and hinge support posts, and the hinge yoke.

Figure 4C:
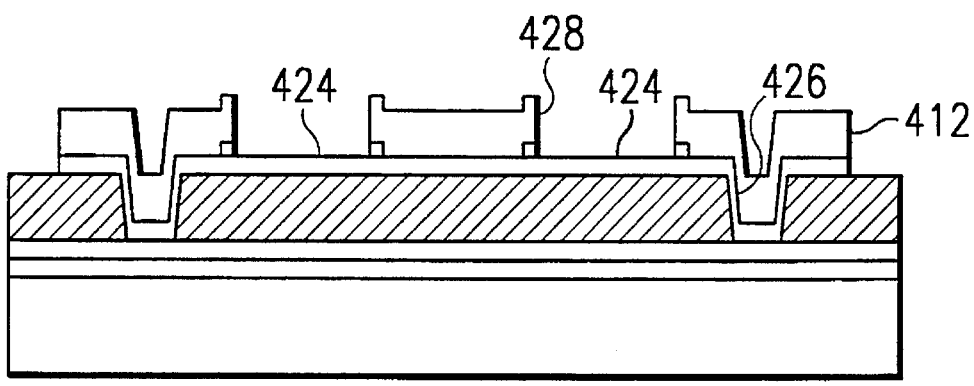
FIG. 4c is a cross-sectional view of one element of the DMD array of FIG. 1 taken along the hinge axis showing the hinge and electrode metal layers.

A single plasma etch is used to pattern the hinges, electrodes, support posts, and hinge yoke metal. The two oxide layers act as etch stops and protect the metal beneath them. After completion of the plasma etch, the oxide etch stops are removed from the thin metal hinges and thicker metal support posts and electrodes by plasma etching. FIG. 4c shows the DMD element after the oxide etch stops have been removed.

Figure 4D:
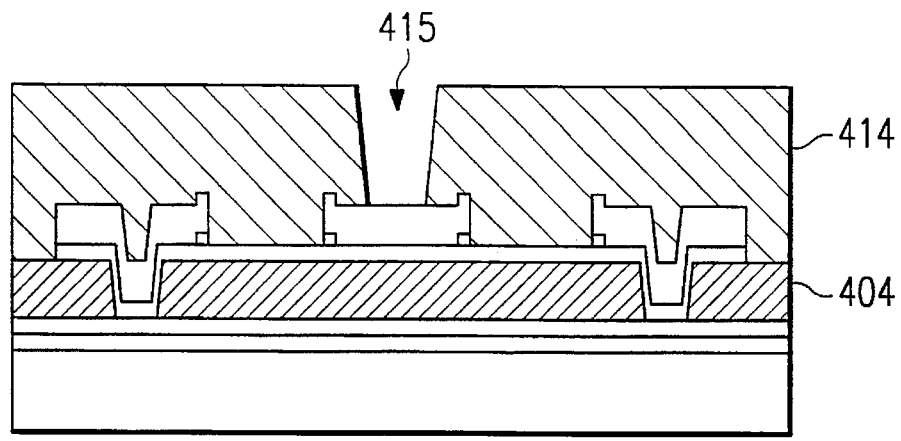
FIG. 4d is a cross-sectional view of one element of the DMD array of FIG. 1 taken along the hinge axis showing the mirror spacer layer.

As shown in FIG. 4d, a thick mirror spacer layer 414 is spin-deposited over the hinges and electrodes and patterned with holes 415 that will form the mirror support posts 416. Spacer 414 is typically 2.2 μm thick but may be thicker or thinner depending on the required rotation of the finished mirror. The mirror spacer layer 414 is typically deep UV hardened to a temperature of 180° C. to prevent flow and bubbling during the subsequent processing steps. Note that no degradation of the hinge spacer layer 404 occurs because the hinge spacer was hardened to a higher temperature (200° C).

Figure 4E:
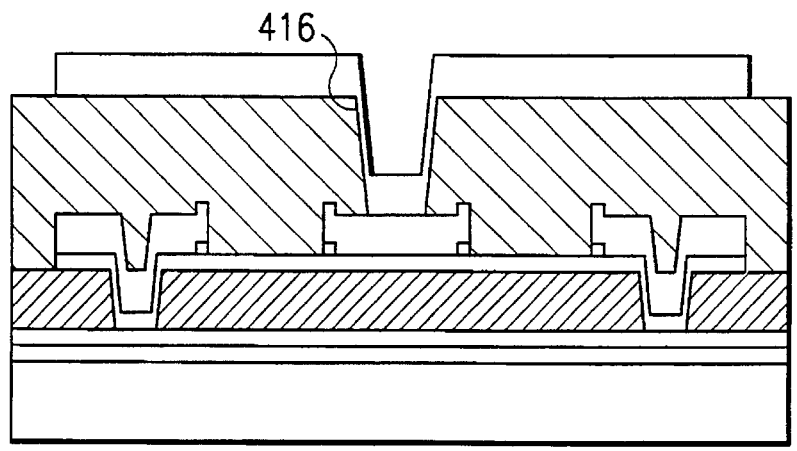
FIG. 4e is a cross-sectional view of one element of the DMD array of FIG. 1 taken along the hinge axis showing the mirror metal layer.
Figure 4F:
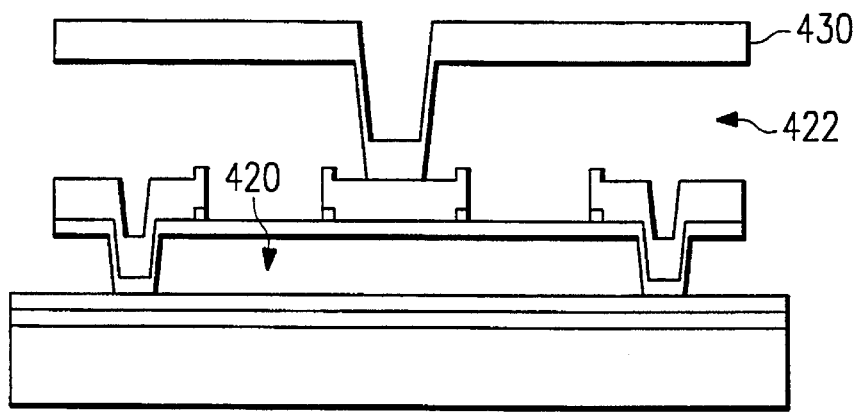
FIG. 4f is a cross-sectional view of one element of the DMD array of FIG. 1 taken along the hinge axis showing the completed device following a plasma etch undercut.

A thick layer of an aluminum alloy is then sputter-deposited to a typical thickness of 4250 Angstroms, as shown in FIG. 4e. This layer forms both the mirror support post 416 and the mirror 430. A masking oxide layer is then plasma-deposited onto the mirror and patterned in the shape of the mirrors. The mirror metal layer is then plasma etched to form the mirrors and support posts. The masking oxide layer is typically left in place while the wafer is coated with PMMA, sawed into chip arrays and pulse spin-cleaned with chlorobenzene. The chips are then placed in a plasma etching chamber where the masking oxide layer and both spacer layers 404 and 414 are removed leaving hinge air gap 420 and mirror air gap 422, as shown in FIG. 4f.

Figure 5:
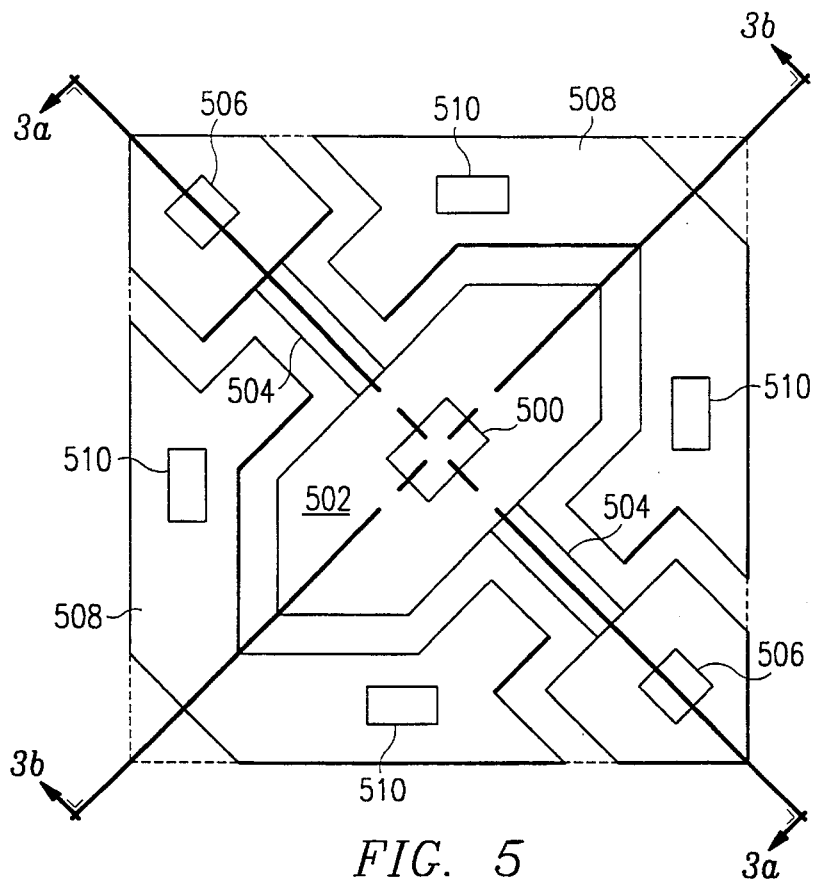
FIG. 5 is a plan view of one element of the DMD array of FIG. 1 with the mirror removed to show the underlying address electrodes and landing yoke.
Figure 6:
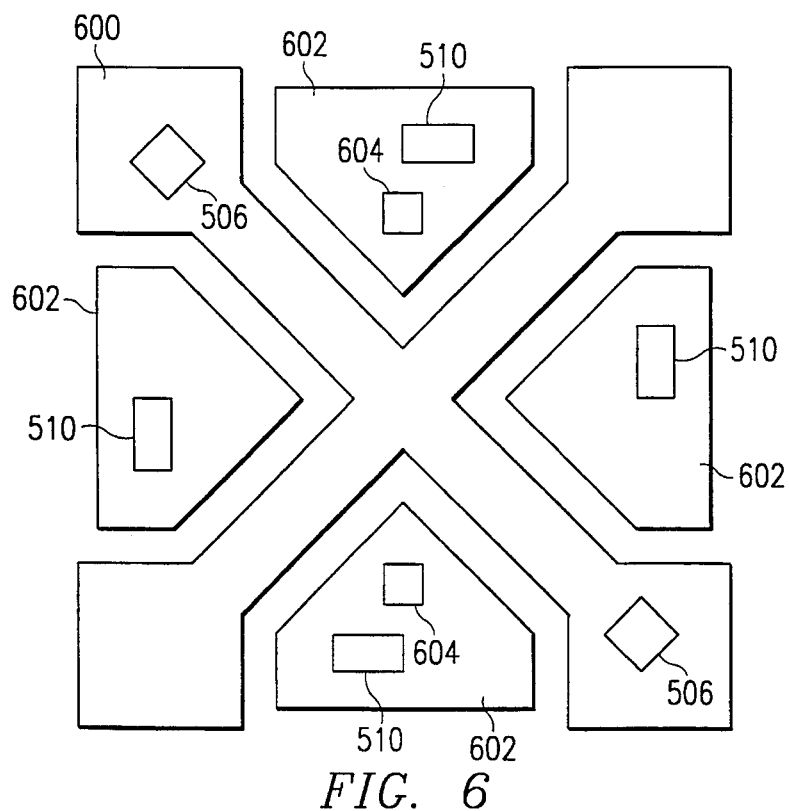
FIG. 6 is a plan view of the DMD element of FIG. 5 with the address electrodes and landing yoke removed to show the bias/reset bus.

Two plan views of different levels of one embodiment of a DMD element according to the present invention are shown in FIGS. 5 and 6. In FIG. 5 the mirror layer has been removed to show the underlying components. A dashed line indicates the outline of the mirror. Mirror support post 500 is on hinge yoke 502 which is supported by a pair of torsion hinges 504. A hinge support post 506 is attached to one end of each of the two torsion hinges. The two address electrodes 508 are supported by the electrode support posts 510. The shape of the address electrodes 508 and hinge yoke 502 as well as the placement of the support posts could be altered if desired.

FIG. 6 shows the element from FIG. 5 with the address electrodes, landing yoke, and hinges removed to show the M3 metalization layer. The M3 layer is patterned to leave two types of structures, the bias/reset bus 600 and the address support pads 602. Hinge support posts 506 are built on the bias/reset bus 600 portion of the M3 layer, while address electrode support posts 510 are built on address support pads 602 as shown. Vias 604 connect the address support pads with the address circuitry built on the substrate through the protective oxide.

Figure 7A:
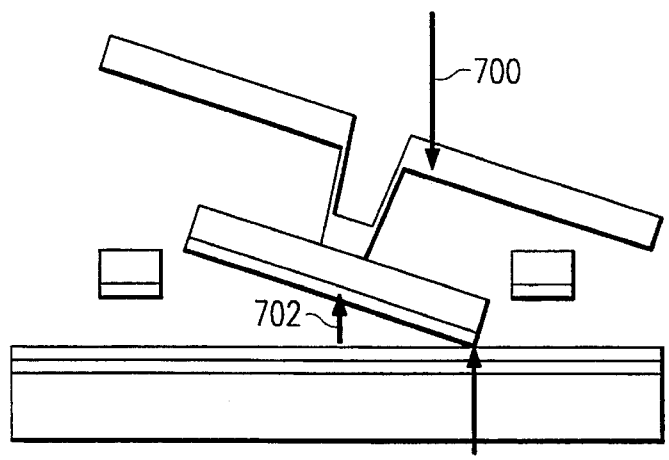
FIG. 7a is a cross-sectional view of one DMD element showing the deflection forces in equilibrium.

FIG. 7a shows the DMD element of FIG. 3b rotated with the landing yoke contacting the bias/reset portion of the M3 metalization layer. The length of the landing tip of the hinge yoke determines how far the mirror may rotate for a given hinge to M3 air gap. In the example shown, the landing tip is chosen to have approximately one-half the moment arm of the mirror element itself. Assuming that the size of the mirror and the height of the mirror support post are chosen to prevent the mirror tip from landing, then the thickness of the hinge air gap, and the length of the landing tip will determine how far the mirror will rotate before being stopped by the landing tip. As will be discussed, the optimum landing tip length depends on the moment arm length of the electrostatic attractive force between the mirror and the address electrode. This leaves the hinge air gap thickness to be varied, within process capabilities, to control the maximum mirror rotation. The mirror rotation must be sufficient to isolate the two alternate reflected light paths and allow room for the necessary projection optics. Typical devices have approximately 10 degrees of mirror rotation in each direction.

After the landing tip has landed on the bias/reset bus, there is a tendency for it to stick to the bias/reset bus because of the short range dipole moment attraction between the surface molecules of the landing tip and bias/reset bus called Van der Waals force. The surface of the landing tip and bias/reset bus may be treated with a passivation layer to reduce sticking, but the hinge restoring force may still be insufficient to provide reliable operation. A technique called resonant reset may be used to provide up to ten times the hinge restoring force, thus insuring that the landing tip will reliably break free from the landing electrode.

Resonant reset is a voltage pulse, or series of pulses, that increases the attraction between the mirror and the address electrode. According to one embodiment, resonant reset is a series of five 24-volt pulses applied to the mirror at the resonant frequency of the mirror, approximately 5 MHz. The first pulse bends the mirror concave up, forcing the tip against the landing electrode and imparting a downward force to the tip. When the first pulse is turned off, the mirror recovers, then overshoots to a concave down position, imparting an upward tip reaction force which tends to break the tip free from the landing electrode. Application of additional pulses increases the oscillation amplitude and increases the corresponding upward tip reaction force that tends to break the mirror free from the landing surface.

Typically there is no further increase in the tip reaction force after five pulses. This is because the energy lost to air damping and in the bending of metal is equal to the energy gained by each reset pulse. Once the maximum oscillation has been achieved, the pulse train is turned off and the mirror tip is allowed to break free, resetting the mirror. It should be pointed out that the mirror resonance is the most efficient reset frequency, providing a large tip reaction force tending to break the mirror free while at the same time keeping the stress in the hinges at a low level.

One advantage of landing on the landing tip of the hinge yoke compared to landing on the mirror tip is the shorter dimension of the landing tip. This shorter dimension reduces the moment arm of the sticking force relative to the hinge rotation axis. The smaller moment arm results in less sticking torque and therefore less torque necessary to reset the mirror element. The torque generated by the reset pulse is dependent on both the voltage level of the reset pulse and the geometries of the address electrode and mirror. The adhesive force between the landing tip and the landing surface is independent of the moment arm length. The shorter the moment arm of the sticking force, the smaller the torque generated by the sticking force and the easier it is for the reset torque to overcome the sticking torque. The shorter dimension of the landing yoke compared to the mirror allows a corresponding reduction in the reset voltage necessary to achieve a reliable reset and may permit a single pulse reset.

The use of a single reset pulse is desirous to eliminate the problem of twinkling pixels. Twinkling occurs when a mirror is not stuck, or only slightly stuck to the bias/reset bus. The forces generated by the reset pulse train may be sufficient to free the lightly stuck mirrors before the fifth and final pulse. When this occurs, the mirror springs away from the bias/reset bus and is then returned to the bias/reset bus by a subsequent reset pulse. The mirror is then stuck to the bias/reset bus and the remainder of the reset pulse train may not generate enough energy to free the mirror. The mirror will remain stuck until the next complete reset period frees it from the bias/reset bus.

In operation, an image is created using darkfield optics in which the DMD mirrors are rotated one direction, "on", to deflect light to the image plane and rotated in the other direction, "off", to deflect light away from the image screen. Pulse-width modulation is used to obtain a gray scale display. If the mirror is stuck in the "on" position it may reflect light to the screen when it should have been in the "off" position. The pixel will momentarily appear brighter than it should and will appear to scintillate or twinkle. The same problem occurs, but is much less noticeable, when mirrors that are "off" fail to reset and then do not rotate to the "on" position. The disclosed architecture may eliminate twinkling pixels by allowing the use of a single pulse reset.

Figure 7B:
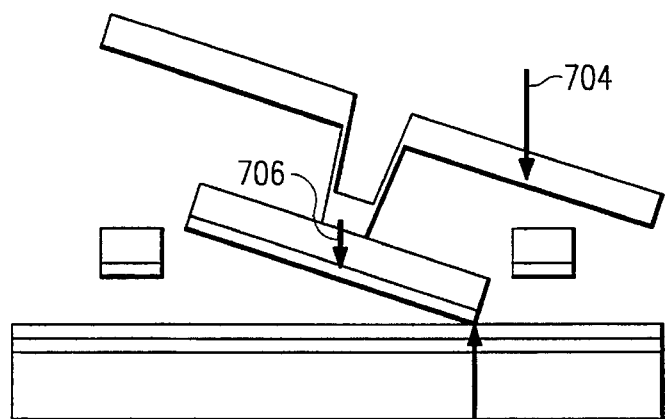
FIG. 7b is a cross-sectional view of one DMD element showing the deflection forces in equilibrium.
Figure 7C:
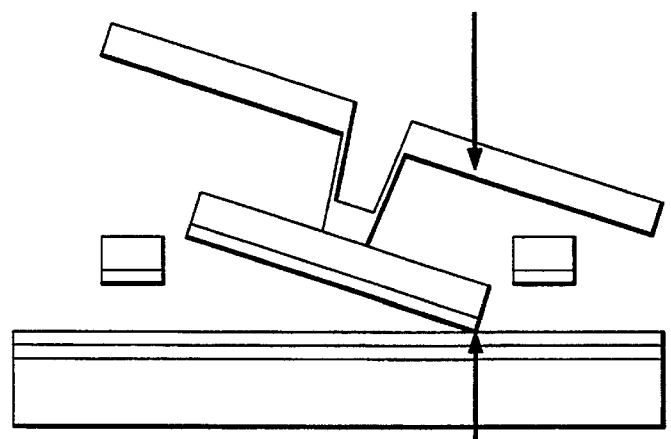
FIG. 7c is a cross-sectional view of one DMD element showing the deflection forces in equilibrium.

While the shorter dimension of the landing yoke compared to the mirror reduces the torque necessary to reset a stuck mirror, using too short a landing yoke can cause additional stress on the mirror hinges. An understanding of the deflection forces acting on the DMD mirrors, illustrated in FIGS. 7a–7c, is required to understand the additional stress on the hinges. The moment arm of the electrostatic attractive force between a DMD mirror and address electrode depends on the shape of the mirror and hinge. For a typical hidden hinge DMD having square mirrors, the moment arm of the electrostatic force, or the center of the electrostatic force, is approximately one-half the distance from the hinge axis to the mirror tip. When the mirror is rotated, the electrostatic force must be offset by an equal and opposite force arising from the combination of mirror tip and hinge reaction forces.

If the geometry of a rotated DMD is such that the landing tip is further from the rotation axis than the attractive electrostatic force 700, as shown in FIG. 7a, an upward force 702 is required from the hinges in order to maintain equilibrium. This means that when a hidden hinge DMD that lands on the mirror tip is rotated, the mirror not only rotates, but also translates toward the substrate until the upward force 702 from the hinges increases and equilibrium is reached.

If the attractive electrostatic force 704 is further from the rotation axis than the landing tip, as shown in FIG. 7b, the mirror will tend to translate upward until a downward force 706 generated by the hinges places the mirror in equilibrium. The up and down forces generated by the hinges have two effects. First, the deformation of the hinges results in increased stress on the hinges which can cause the hinges to permanently sag due to metal creep. Secondly, each mirror will rotate differently depending on the strength of the hinges and the strength of the forces generated by the bias voltages. Because the brightness of the projected pixel is dependent on the rotation angle of the mirrors, if the mirrors are not all rotated the same amount, the image pixels will not appear uniform and the image will be degraded. In order to benefit from the enhanced reset capability of the landing yoke, minimize stress on the hinges, and minimize the dependence of brightness on bias voltage, the landing tip should be directly under the center of the electrostatic attractive force, as shown in FIG. 7c.

It is important that the landing yoke is aligned with the hinge axis. Improper alignment varies the effective length of the landing tip which effects the amount the element rotates before the landing tip contacts the bias/reset bus. Poor rotation control from one element to the next may degrade the image quality, and especially the image brightness uniformity. One solution is to pattern the landing tip at the same time the hinges are patterned, thus ensuring the proper alignment of the hinges and landing tip. This solution is not practical in prior art DMD architectures. Patterning conventional torsion beam DMDs to expose hinge metal at the mirror tip increases the light diffraction from the mirror tip resulting in a lower optical contrast ratio. The torsion hinges of conventional hidden hinge DMDs are fabricated in a different plane from the landing tip of the mirror, thus preventing the use of a single patterning step. Because the architecture disclosed herein allows the landing tip to be patterned at the same time the torsion hinges are patterned without increasing light diffraction, the hinge to yolk alignment is easily controlled and will result in a more consistent rotation between the elements of the array.

Figure 8:
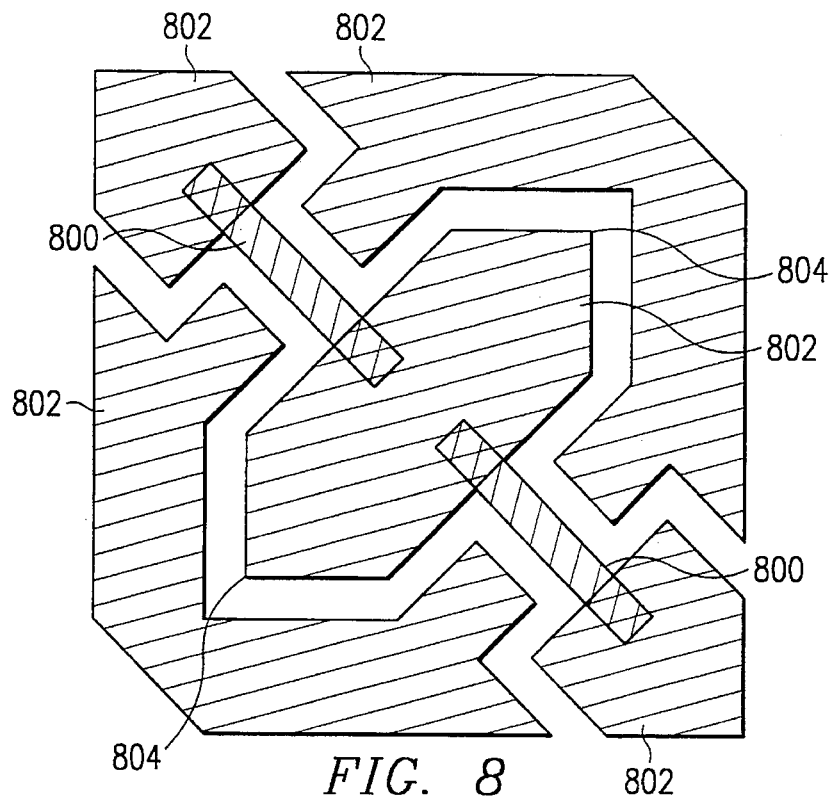
FIG. 8 is a plan view of one DMD element showing first embodiment of a first and second patterned oxide etch stop.
Figure 9:
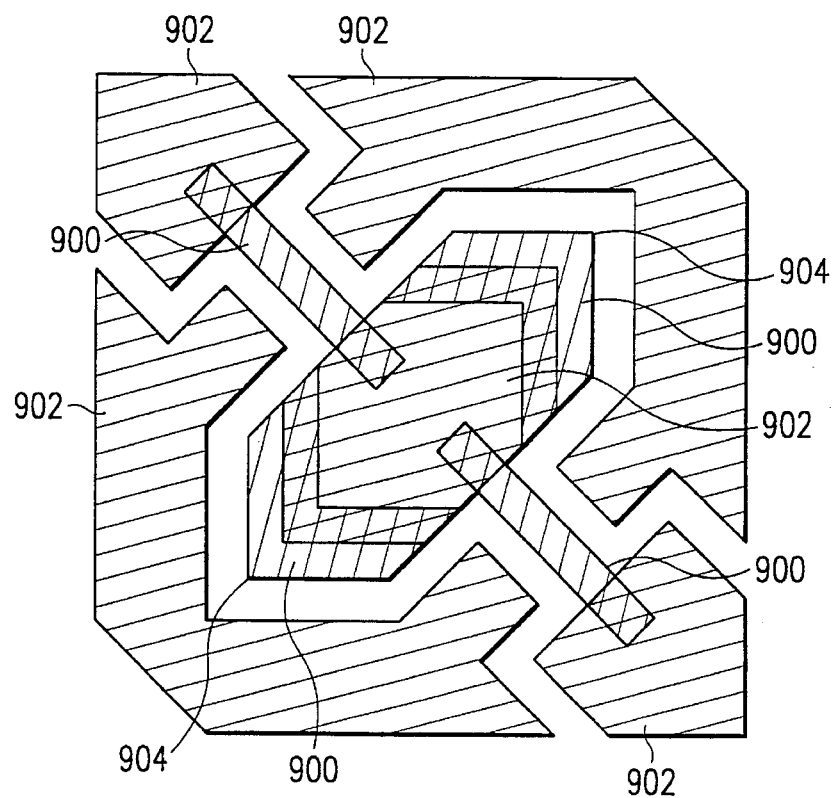
FIG. 9 is a plan view of one DMD element showing a second embodiment of a first and second patterned oxide etch stop.

FIGS. 8 and 9 illustrate the typical oxide etch stops used to fabricate devices according to the present invention. In FIG. 8, a first oxide etch stop 800 is deposited on the hinge metal and patterned to define only the hinges. After the electrode metal layer is deposited, a second oxide etch stop 802 is deposited and patterned to define the hinge support post caps, the landing yoke, and the address electrodes. Note the two oxide etch stops overlap at each end of the hinges. When the electrode and hinge metal layers are etched, in a single etch step, the metal beneath the etch stops will remain. Therefore, both the thick electrode metal layer and the thin hinge metal layers will remain under the second oxide etch stop 802 while only the thin hinge metal layer will remain under the first oxide etch stop 800. As shown in FIG. 8, the hinges are defined when the first oxide etch stop 800 is patterned while the tip 804 of the landing yoke is defined when the second oxide etch stop 802 is patterned.

FIG. 9 shows the oxide etch stops typically used to form self-aligned hinges. The first oxide etch stop layer 900 is now patterned to define not only the hinges, but also the tip 904 of the landing yoke. The second oxide etch stop 902 defines the hinge support post caps, address electrodes, and the center portion of the landing yoke. The second oxide etch stop does not extend to the tip 904 of the landing yoke. Note the two oxide etch stops now overlap near the tips of the landing yoke as well as at each end of the hinges. Once again, when the metal layers are etched, both the thick electrode metal layer and the thin hinge metal layers will remain under the second oxide etch stop 902 while only the thin hinge metal layer will remain under the first oxide etch stop 900. However, where in FIG. 8 the tips of the landing yoke and the hinges were defined by separate patterning steps, the landing yoke tips and hinges are now patterned in a single step, thereby ensuring alignment with each other.

Figure 10:
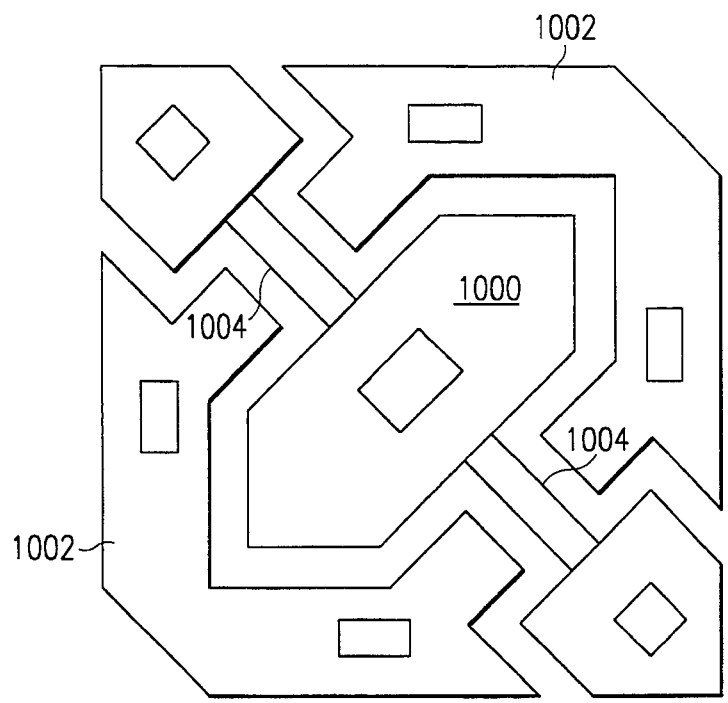
FIG. 10 is a plan view of one DMD element after etching the hinge and electrode metal layers using the first and second oxide etch stop of FIG. 9.
Figure 11:
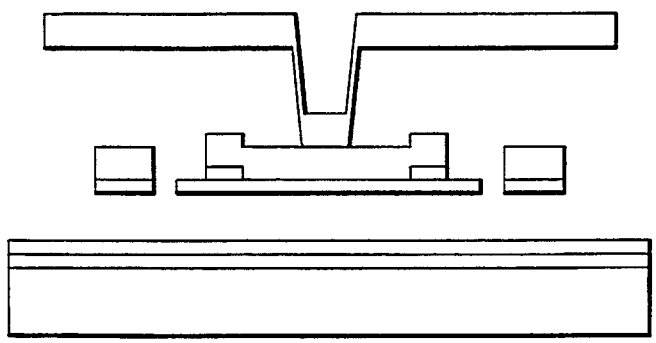
FIG. 11 is a cross-sectional view of one DMD element having a landing yoke tip according to the embodiment shown in FIG. 10.
Figure 12:
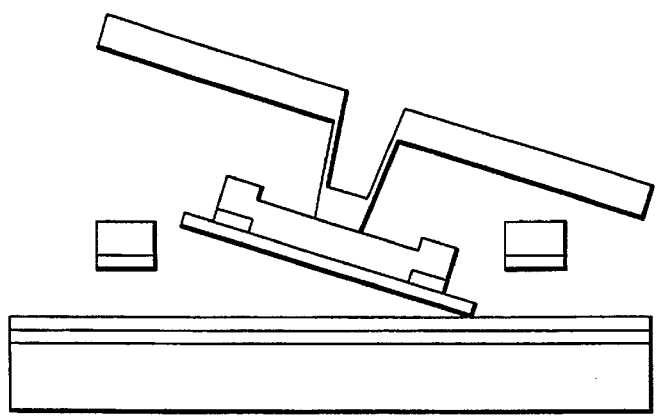
FIG. 12 is a cross-sectional view of the DMD element of FIG. 11 showing the mirror and landing yoke in the rotated position.

FIG. 10 is a plan view of one embodiment of a self-aligned DMD element after the hinge and electrode metal layers have been etched, showing the hinge yoke 1000, address electrodes 1002, and hinges 1004. FIGS. 11 and 12 are cross section views of the self-aligned DMD element. The cross section plane of FIGS. 11 and 12 is the same as in FIGS. 3b and 3c. FIG. 11 shows the DMD element in the neutral position while FIG. 12 shows the DMD element in the deflected or rotated position.

The design of the yoke may also be altered on a row-by-row basis to compensate for the height of the underlying circuitry. The typical CMOS circuitry design results in height variations that occur every other line and cause a visual line-pairing effect. DMD designs that land on the mirror tip can not compensate for this variation without altering the size or shape of the mirror, which would also cause brightness variations. The length of the landing yoke may be altered on alternate rows to compensate for the alternate row height variations of the underlying circuitry, thus reducing the circuitry's effects on brightness. DMDs that are designed to use split-reset, as will be explained below, typically have circuitry height variations that reoccur every sixteen lines. Therefore, the typical split-reset circuitry requires the landing yoke variations to also repeat every sixteen lines.

In order to reduce the bandwidth requirements of the data input path, and reduce the required number of CMOS circuit elements, it is desirable to be able to only load and reset a portion of the mirror elements at one time. This feature, called split-reset memory multiplexed addressing, allows the majority of elements to display data while the remainder of the elements are loaded, reset, and electromechanically latched. Thus one CMOS circuit element, for example an SRAM cell, may address more than one DMD element. In order to implement split-reset, the elements are grouped into blocks, and the mirror bias signal for each block is isolated. The control electronics must have independent control of the mirror bias signal for each block. The bias/reset bus is used to connect the mirror bias signals of groups of DMD elements together to allow a common mirror bias to be applied to an entire block of elements. The grouping of the elements is not critical but will determine the logic required to extract the data for a block from the data for the entire frame. Typically all of the elements in a row are in the same block, and the number of rows in a block is determined by the number of blocks desired. For example, adjacent rows may be grouped together or the rows of each block may be interleaved.

Figure 13:
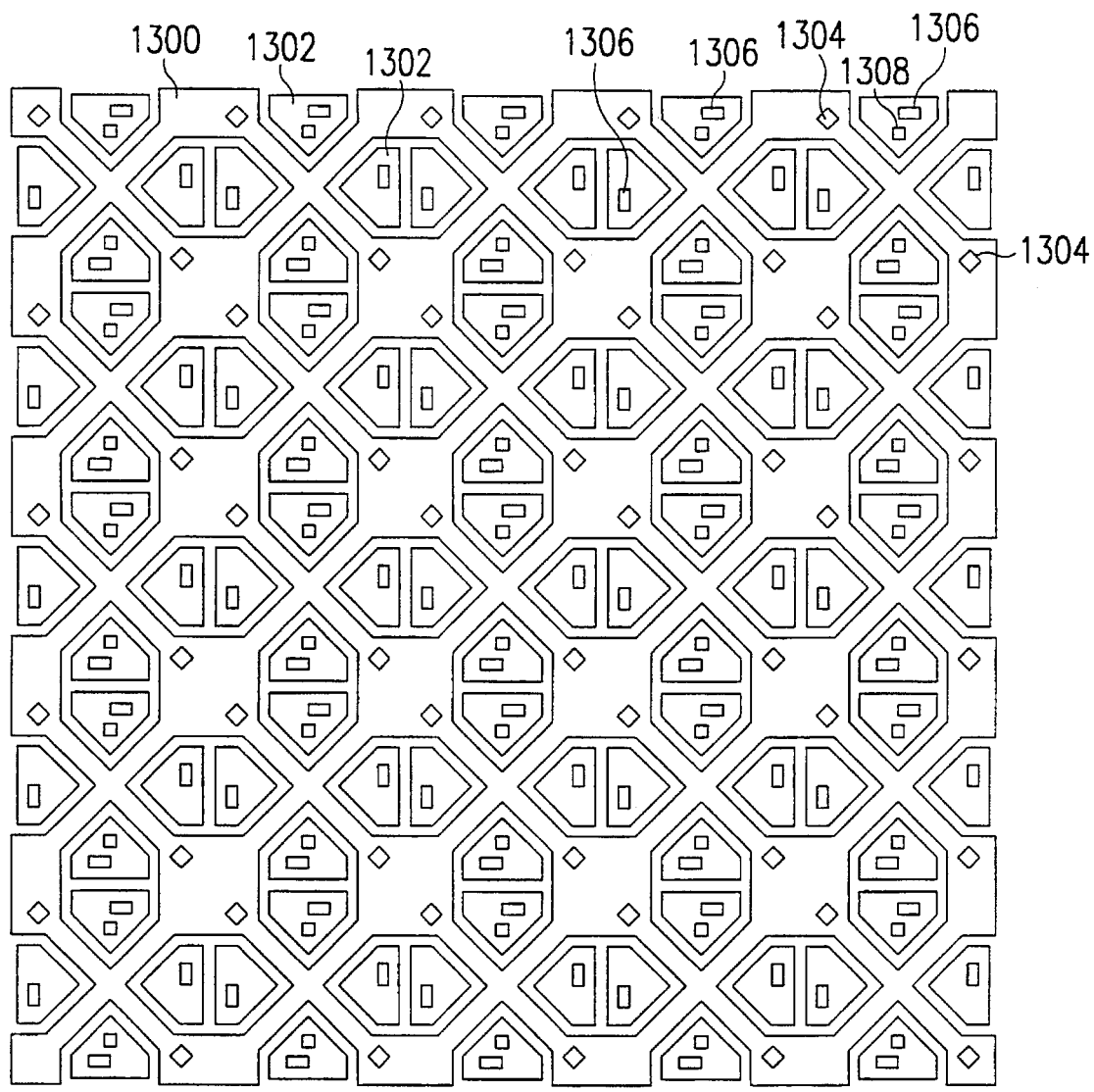
FIG. 13 is a plan view of the bias/reset bus of a 5×5 array of interconnected DMD elements where the bias/reset buses form a single bias/reset bus.
Figure 14:
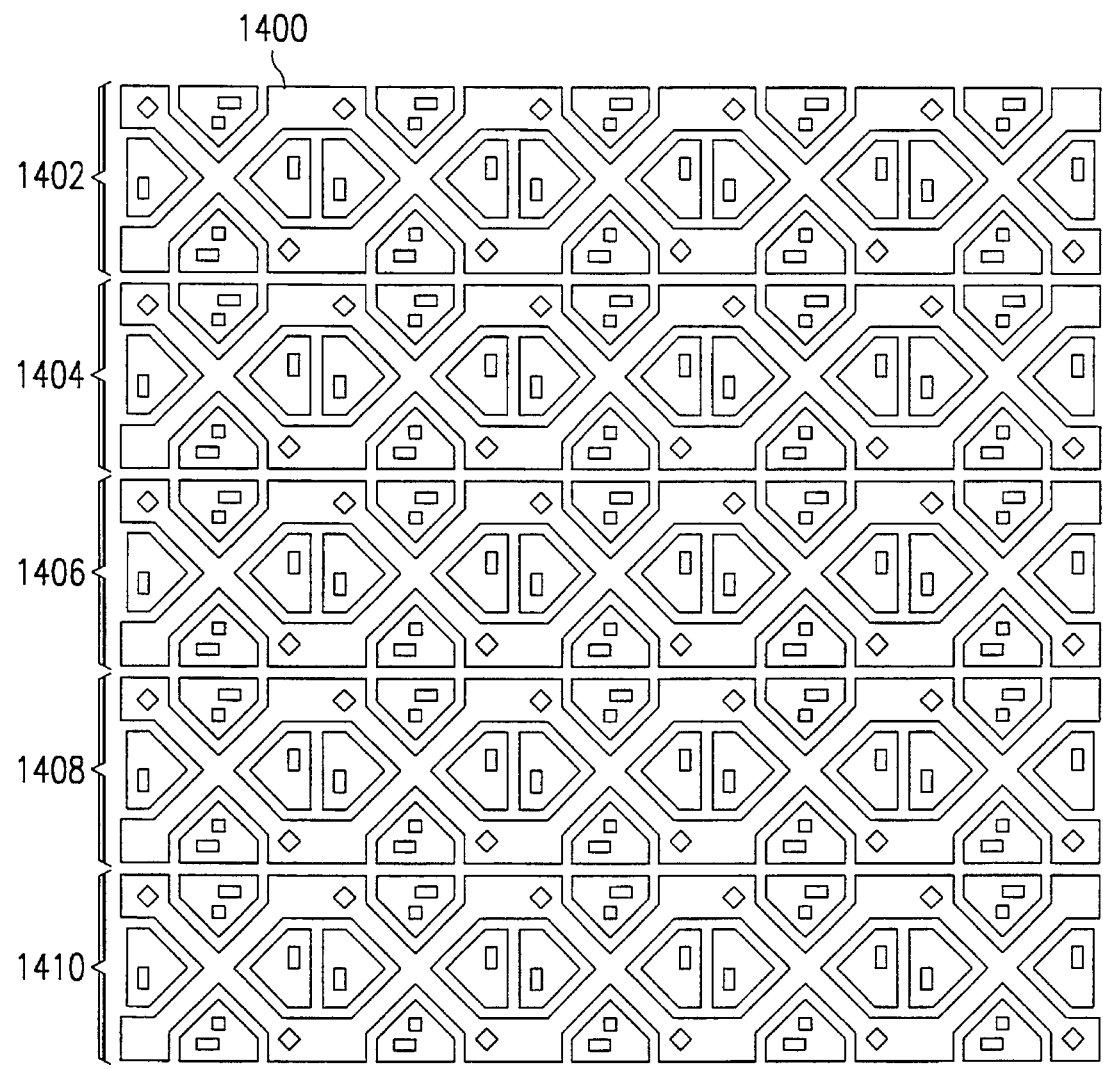
FIG. 14 is a plan view of the bias/reset bus of an 5×5 array of DMD elements where the bias/reset buses are electrically split or isolated between horizontal rows.

The bias/reset bus carries the mirror bias signal to each of the mirrors via the mirror support structure. Due to the design of the bias/reset bus disclosed, the elements may be efficiently grouped into blocks. FIG. 13 shows an array of DMD elements with the mirror, hinge, and electrode metal removed to expose the bias/reset bus 1300 and address support pad 1302 metalization. For reference, the hinge support post locations 1304, address electrode support locations 1306, and address support pad vias 1308 are shown. As shown in FIG. 13, bias/reset bus 1300 of the five rows of five DMD elements is electrically connected. FIG. 14 shows the bias/reset bus metalization 1400 of an array of five rows of five DMD elements that is fabricated to form five isolated rows 1402, 1404, 1406, 1408, and 1410. As mentioned above, the actual pattern of connecting the devices is not critical. For example, the elements could be grouped into vertical, horizontal, or diagonal rows. In the example of FIG. 14, if the blocks were to consist of alternate rows, the rows would be connected outside of the active mirror array area. This could be done by adding metalization outside the active mirror array area and patterning it to connect the rows, using jumpers to connect the rows, or connecting the rows during bond-out.

The disclosed architecture greatly facilitates the split-reset interconnections. Prior DMD designs landed on the mirror tip and therefore required a landing electrode near the corner of the device that carried the mirror bias voltage. The landing electrodes were built on the same level as the address electrodes and were supported by the hinge support posts. The size and placement of these landing electrodes typically required one landing electrode to be shared by diagonally adjacent elements and also supported by the hinge support posts of another diagonally adjacent pair of elements, therefore four elements were electrically connected. Thus, prior architectures simply did not permit the electrical isolation necessary to implement a row by row, or horizontal, split-reset.

The mechanical and electrical isolation between the rows of the array that allows split-reset also allows the mirrors of adjacent rows to be staggered by one-half of the pixel pitch, increasing the effective horizontal resolution of the display. Secondly, because there is no mechanical connection between the hinge supports of adjacent elements, if one element experiences a structural failure, the failure can no longer lead to a collapse of the adjacent mirror elements.

Because the DMD no longer relies on the mirror tip to limit the rotation, the mirror does not have to be square. This allows the use of other mirror shapes to be used. One current proposal for U.S. HDTV is a 16:9 aspect ratio screen with 960 lines. Square pixels would require 1707 horizontal pixels if the horizontal and vertical spacings were equal. However, proposed broadcast transmission standards contain as few as 1400 horizontal pixels. Therefore, either horizontal data resampling would be required or a rectangular pixel shape would have to be used.

Wear on the landing electrodes is another problem which the landing yoke lessens. Because of the abrasion between the mirror tip and the landing electrode in prior DMD designs, the force needed to reset the mirror gradually increased with the age of the device. The more efficient reset of this design will reduce the abrasion between the landing yoke and the landing electrode because fewer reset pulses will be required. In addition, the reset pulses are designed to cause the mirror to resonate which, in prior DMD designs where the mirror tip lands, resulted in a tangential scraping motion between the mirror and the landing electrode. The landing yoke design eliminates the scraping motion because the mirror tip is not in contact with the landing electrode and the landing yoke does not resonate.

Figure 15A:
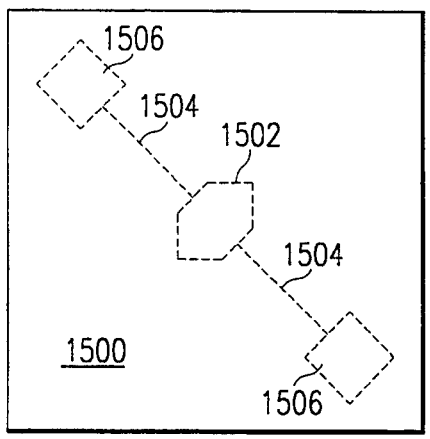
FIG. 15a is a plan view of the hinge layout for one DMD element having 45° torsion beam hinges.
Figure 15B:
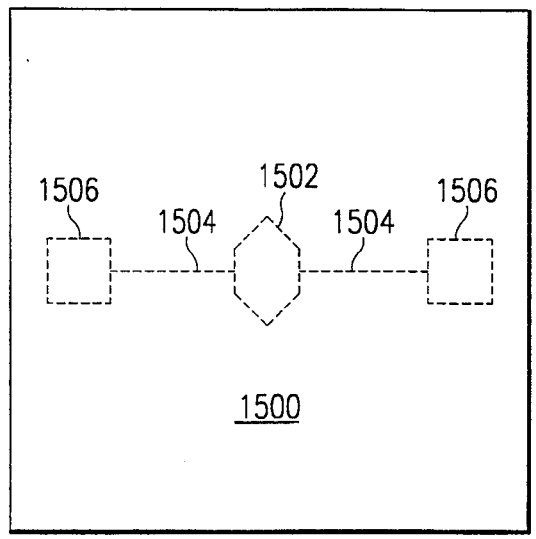
FIG. 15b is a plan view of the hinge layout for one DMD element having 90° torsion beam hinges.

Although the previous discussion has centered on the 45° torsion hinge DMD design, a simplified view of which appears in FIG. 15a, other hinge designs could benefit from the disclosed invention. For example, the 90° torsion hinge element of FIG. 15b could use a landing yoke to achieve the advantages discussed earlier. In FIGS. 15a and 15b, a plan view of the mirror element 1500, landing yoke 1502, hinge 1504, and hinge support post 1506 is shown.

Figure 16:
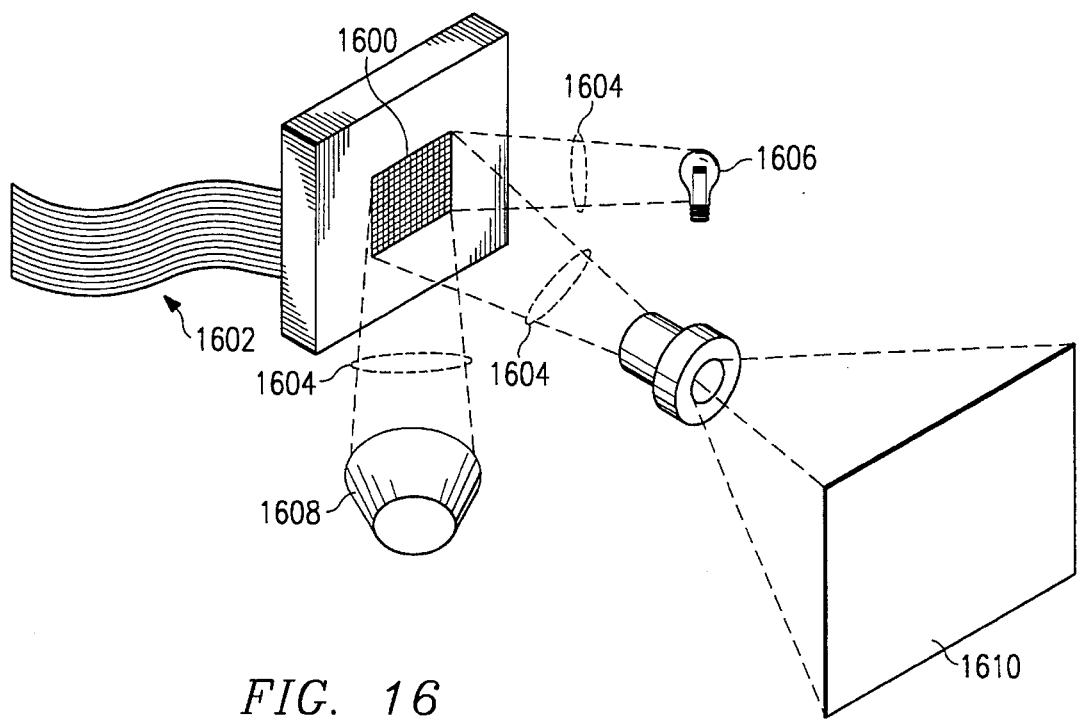
FIG. 16 is a schematic diagram of one embodiment of a DMD based image projection system.

The disclosed DMD is a spatial light modulator that may be used several ways. The DMD may be used to project images for direct or indirect viewing or it may be used to modulate light as part of a xerographic print engine. FIG. 16 is a schematic diagram of an image projection system. Digital image data is written to DMD 1600 via electrical input 1602 and controls the operation of the DMD mirrors. Light 1604 from light source 1606 reflects off of DMD 1600 and is either absorbed by light absorber 1608 or projected onto screen 1610 depending on the rotation polarity of the DMD mirrors.

Figure 17:
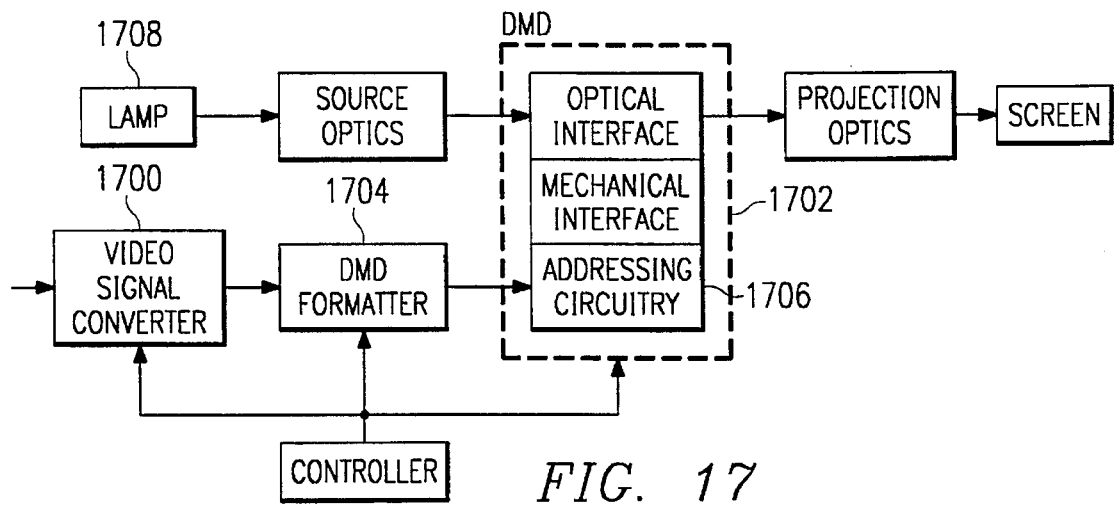
FIG. 17 is a block diagram of one embodiment of a DMD based display system.

FIG. 17 is a block diagram of one embodiment of a display system. In FIG. 17, analog image data is sampled and converted to digital image data by the video signal converter 1700. The digital image data is formatted for display on the DMD 1702 by DMD formatter 1704. If the image data input into the system is digital, then the video signal converter 1700 is not used and the image data is input directly into the DMD formatter 1704. The formatted digital data is then written into the addressing circuitry 1706, typically comprised of SRAM memory cells, of the DMD. The outputs of the addressing circuitry 1706 control the rotation of the DMD mirrors and control the modulation of the light received from the lamp 1708. The modulated light is then projected into the viewer's eye or onto a display screen.

Figure 18:
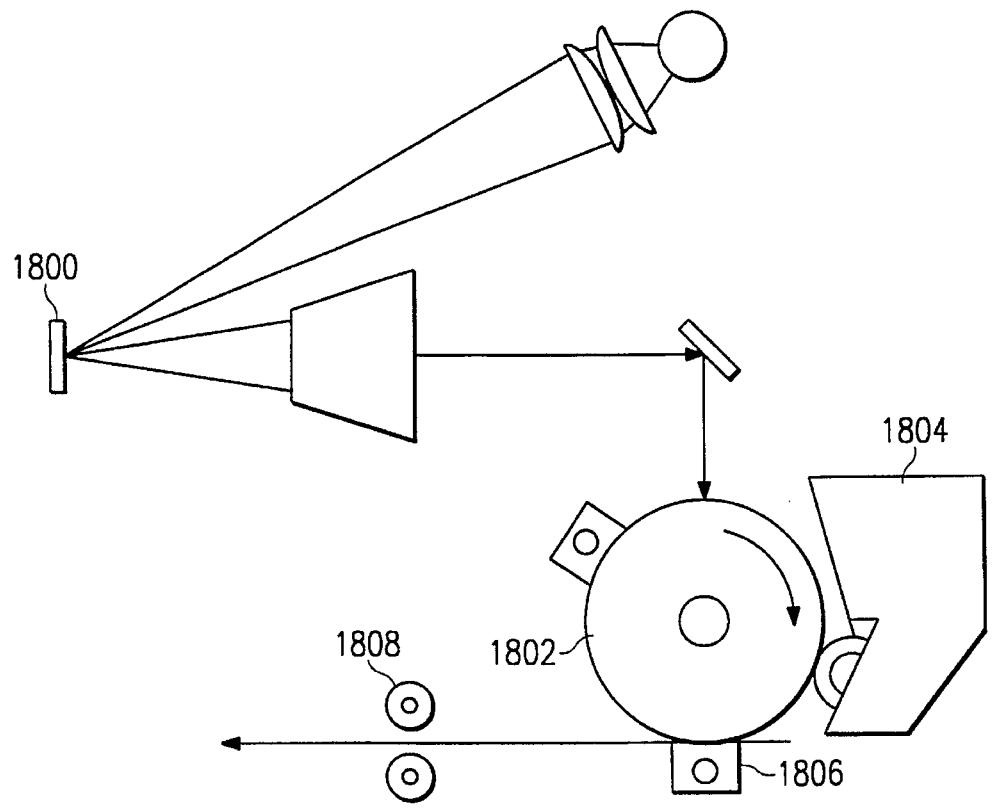
FIG. 18 is a pictorial view of one embodiment of a DMD based printer system.

FIG. 18 is a pictorial view of one embodiment of a printer system using the disclosed DMD 1800. The operation of the printer system is similar to that of the display system except that instead of projecting the modulated light onto a screen, the light is projected onto an electrostatically charged print drum 1802. When the light impinges on the print drum 1802, the area illuminated is discharged. As the drum rotates, the printer drum 1802 rotates past a developer source 1804 and the areas of the printer drum 1802 that remain charged attract some of the developer. The developer is transferred to the object being printed by the transfer corona 1806 and adheres to the object being printed as it passes through fuser 1808.

Thus, although there has been described to this point a particular embodiment for a spatial light modulator and method, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art. It is intended to cover all such modifications as fall within the scope of the appended claims.

What is claimed is:

1. A method of fabricating an array of rotatable elements, each said element individually rotatable into at least two states, said method comprising the steps of:

providing a substrate for supporting all of said elements in said array;

constructing a supporting structure between said substrate and said elements, comprising at least two hinges, and at least one hinge yoke, said hinges connecting said substrate and said hinge yoke, said hinge yoke connected to said elements;

maintaining said elements in a plane separate from the plane of said substrate and said hinge yoke, wherein when said elements are rotated, said hinge yoke rotates with said elements and limits the rotation of said elements by contacting said substrate.

2. The method of claim 1 further comprising the step of constructing address electrodes for providing signals to control the rotation of said elements.

3. The method of claim 1 further comprising the step of constructing address electrodes for providing signals to control the rotation of said elements, wherein said address electrodes are supported away from said substrate.

4. The method of claim 1 further comprising the step of constructing address electrodes for providing signals to control the rotation of said elements, wherein said address electrodes are supported away from said substrate, said address electrodes constructed in the same plane as said at least two hinges.

5. The method of claim 1 further comprising the step of fabricating a bias/reset bus, said bias/reset bus constructed on said substrate and electrically connected to said elements.

6. The method of claim 1 further comprising the step of fabricating control circuitry in said substrate, said control circuitry operable to control the rotation of said elements.

7. The method of claim 1 further comprising the step of varying the size of said hinge yoke from one said element to another said element.

8. The method of claim 1 said hinge yoke having a tip, wherein said at least two hinges and said hinge yoke tip are patterned simultaneously.

9. The method of claim 1 wherein said array is a spatial light modulator of an image display system.

10. The method of claim 1 wherein said array is a spatial light modulator of a printer system.

11. A digital micromirror device comprising: a substrate;

at least one mirror element;

at least one hinge yoke connected to said at least one mirror element;

at least two hinges between said substrate and said hinge yoke, said hinges supporting said at least one mirror element and allowing said at least one mirror element to rotate relative to said substrate, wherein said hinge yoke limits said rotation of said at least one mirror element.

12. The device of claim 11 further comprising address electrodes for providing signals to control the rotation of said at least one mirror element.

13. The device of claim 11 further comprising address electrodes for providing signals to control the rotation of said at least one mirror element, wherein said address electrodes are supported away from said substrate.

14. The device of claim 11 further comprising address electrodes for providing signals to control the rotation of said at least one mirror element, wherein said address electrodes are supported away from said substrate, and said address electrodes are in the same plane as said at least two hinges.

15. The device of claim 11 further comprising a bias/reset bus, said bias/reset bus constructed on said substrate and electrically connected to said at least one mirror element.

16. The device of claim 11 further comprising control circuitry in said substrate, said control circuitry operable to control the rotation of said at least one mirror element.

17. The device of claim 11 wherein said device has more than one mirror element and the size of said hinge yoke is varied from one said mirror element to another.

18. The device of claim 11 wherein said hinge yoke includes a tip, and wherein said at least two hinges and said hinge yoke tip are patterned simultaneously.

19. The device of claim 11 wherein said device is a spatial light modulator in an image display system.

20. The device of claim 11 wherein said device is a spatial light modulator in a printer system.

21. A digital micromirror device comprising:

a substrate;

at least one mirror element;

at least one hinge yoke connected to said at least one mirror element;

at least two hinges disposed along a hinge axis, said hinges supporting said at least one mirror element away from said substrate and allowing said at least one mirror element to rotate about said hinge axis;

at least one landing electrode disposed between said at least one mirror element and said substrate, wherein said hinge yoke limits said rotation of said at least one mirror element; and at least one address electrode disposed between said at least one mirror element and said substrate such that said at least one landing electrode is between said at least one address electrode and said hinge axis.

22. The device of claim 21 wherein said at least one address electrode is supported away from said substrate.

23. The device of claim 21 wherein said at least one address electrode is in the same plane as said at least two hinges.

24. The device of claim 21 further comprising a bias/reset bus, said bias/reset bus constructed on said substrate and electrically connected to said at least one mirror element.

25. The device of claim 21 further comprising a bias/reset bus, wherein said at least one landing electrode forms a portion of said bias/reset bus.

26. The device of claim 21 further comprising control circuitry in said substrate, said control circuitry operable to control the rotation of said at least one mirror element.

27. The device of claim 21 wherein said device has more than one mirror element and the size of said hinge yoke is varied from one said mirror element to another.

28. A method of fabricating a digital mirror device comprising:

providing a substrate, said substrate including address circuitry;

depositing a first spacer layer on said substrate, said first spacer layer patterned to define hinge support posts and address electrode support posts;

constructing said hinge support posts;

constructing said address electrode support posts;

establishing deformable torsion hinges on said first spacer layer, wherein said deformable hinges are connected to said hinge support posts and to a hinge yoke;

establishing address electrodes on said first spacer layer, said address electrodes connected to said address electrode support posts;

depositing a second spacer layer on said substrate, said second spacer layer patterned to define mirror support posts on said hinge yoke;

establishing a plurality of mirrors on said second spacer layer, said mirrors connected to said mirror support posts; and removing said first and second spacer layers, wherein said mirrors may rotate by deforming said hinges, said hinge yoke for limiting the rotation of said mirrors.

29. A digital micromirror device comprising:

a substrate;

an array of mirror elements;

a plurality of hinge yokes, at least one of said hinge yokes connected to each of said mirror elements in said array of mirror elements;

a plurality of hinges, each of said hinges connected between said substrate and one of said hinge yokes, each of said hinges supporting one of said mirror elements in said may of mirror elements and allowing said mirror elements to rotate relative to said substrate wherein said hinge yokes limit said rotation of said mirror elements in said array of mirror elements.

30. The device of claim 29 further comprising a plurality of address electrodes for controlling said rotation of said mirror elements in said array of mirror elements.

31. The device of claim 30 wherein said address electrodes are supported away from said substrate.

32. The device of claim 31 wherein said address electrodes are supported in the same plane as said plurality of hinges.

33. The device of claim 29 further comprising a bias/reset bus supported by said substrate and electrically connected to said array of mirror elements.

34. The device of claim 29 further comprising control circuitry in said substrate, said control circuitry operable to control the rotation of said array of mirror elements.

35. The device of claim 29 wherein the size of said plurality of hinge yokes is varied from one mirror element to another.

36. The device of claim 29 wherein each of said hinge yokes includes a tip, wherein said hinges and said hinge yoke tips are patterned simultaneously.

37. The device of claim 29 wherein said device is a spatial light modulator in an image display system.

38. The device of claim 29 wherein said device is a spatial light modulator in a printer system.

* * * * *